Patented Oct. 4, 1938

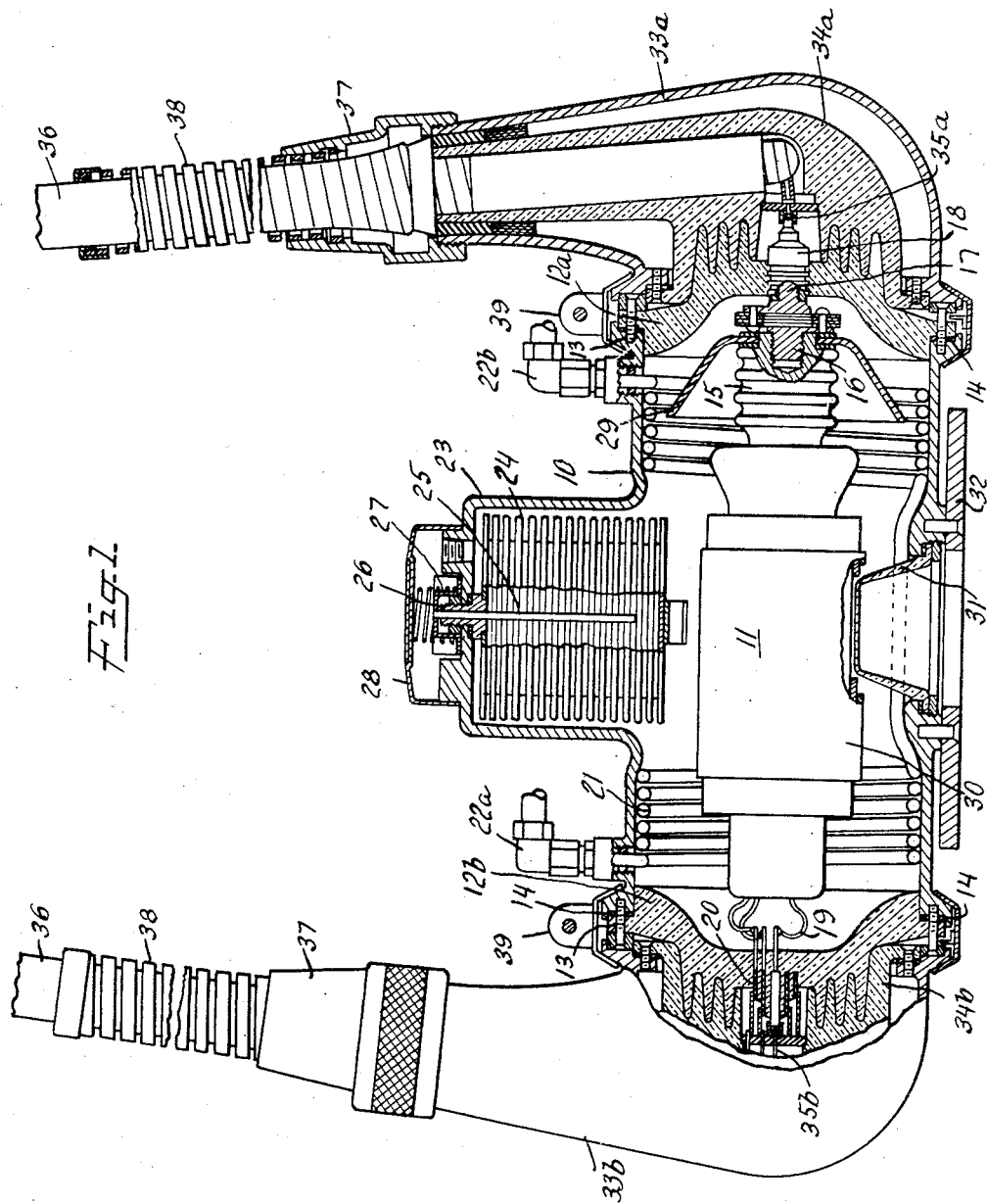

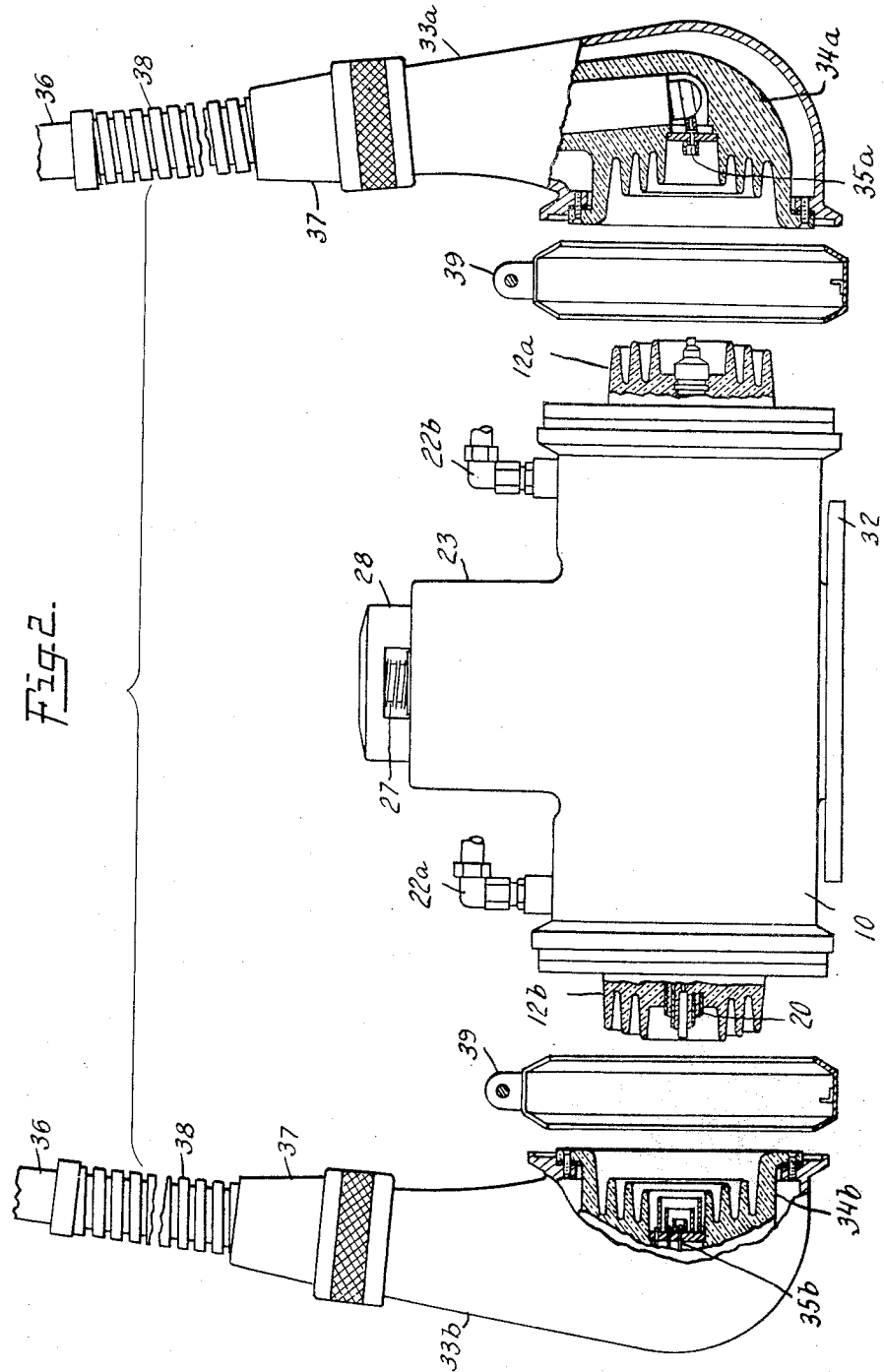

2,132,194

UNITED STATES PATENT OFFICE 2,132,194

X-RAY APPARATUS

Joseph W. Skehan, Stamford, and Raymond R. Machlett, Riverside, Conn., assignors to Machlett Laboratories Incorporated, Springdale, Conn., a corporation of Connecticut Application August 6, 1937, Serial No. 157,634

11 Claims. (Cl. 250—34)

This invention relates to shockproof X-ray apparatus of the type in which energy is supplied to the tube by means of high voltage cables. More particularly, the invention is concerned with a novel apparatus of the type referred to, which offers special advantages in that servicing of the apparatus can be carried on quickly and with facility in the field, even by an unskilled person, and the position of the tube can be easily and freely adjusted even though the cables are relatively stiff and unwieldy.

In shockproof X-ray equipment as heretofore constructed, the tube is immersed in oil in a container and when the tube requires servicing, the oil must be withdrawn from the container before removal of the tube, and thereafter the new or repaired tube is mounted in the container and the oil returned. These operations can be performed only with considerable difficulty in the field, as for example, in a doctor's office or in the hospital, and in addition, they cannot be well done because it is desirable to introduce the oil into the container under vacuum and that requires equipment ordinarily available only in the tube factory.

Another objectionable feature of the prior equipment is that the high voltage cables are attached to the tube terminals in such a way that adjustment of the position of the tube is a difficult operation. Such cables have a grounded metal sheath on their outer surface and concentric conductors between which insulating material is placed, and as they must be able to withstand a prolonged high voltage strain of from 50 to 100 kv. or more between the conductors and sheath, they are large in diameter and relatively stiff. In the prior equipment, they are connected more or less rigidly with respect to the container for the tube, and any movement of the container required to vary the position of the tube can be effected only by bending the cables. The lack of flexibility of the cables accordingly interferes with the free adjustment of the tube.

The present invention is directed to the provision of a novel shockproof X-ray apparatus which avoids objectionable features of the prior equipment, and in the new apparatus, the tube is mounted within an enclosure filled with oil and sealed at the factory, the enclosure with the tube within it constituting a unit which is replaced by a new one whenever the tube requires servicing. The enclosure is so made as to conform generally to the shape of the tube and it is provided at its ends with insulators through which terminals for the tube extend. This construction makes unnecessary the large electrical clearances required in the prior equipment, and permits the enclosure to be small and compact so that it can be shipped and handled about as easily as the tube itself.

In the apparatus, the enclosure is mounted between a pair of cable terminal housings and energy is supplied to the tube through contact members at the ends of the housings which engage those at the ends of the enclosure. The enclosure and housings are secured together by means which prevents separation of the parts but permits relative rotational movement, and as a consequence, adjustments of the position of the tube or of the cables with reference to the tube can be made without difficulty.

For a better understanding of the invention, reference may be had to the accompanying drawings, in which Figure 1 is a view of apparatus of the invention illustrated partly in section and partly in elevation; and Figure 2 is a similar view but showing the main parts of the apparatus disassembled.

Referring to the drawings, the apparatus illustrated includes a casing 10 formed of metal and containing an X-ray tube 11, which may be of conventional construction. At its ends, the casing is closed by insulators 12a, 12b of suitable material which are secured to the casing by screws 13, packing washers 14 being interposed between the insulators and the ends of the casing to seal the casing hermetically.

In the construction shown, the tube is provided with an anode shank 15 mounted on a support generally designated 16 and having a stud 17 threaded into a terminal member 18 embedded in the insulator 12a, the terminal member projecting outwardly beyond the insulator for engagement with a terminal member connected to one of the supply cables. The entire weight of the tube is carried by the anode shank in the mounting described, and at its opposite end, the tube is provided with the usual lead-in wires 19 leading to associated concentric terminal members 20 mounted in the other insulator 12b.

The casing 10 contains a body of oil (not shown) completely enclosing the tube and its terminals, and the heat is withdrawn from the oil by cooling fluid flowing through a coil 21 mounted on the inner wall of the casing and having inlet and outlet fittings 22a, 22b. A chamber 23 leads from the casing and inside it is a collapsible bellows 24 which acts upon a stem 25 movable through a bushing 26 in the end of the chamber to engage an indicator 27 lying within a cap 28 at the top of the chamber. When the oil temperature exceeds a selected value, the expansion of the oil collapses the bellows and raises the indicator to a position in which it is visible through an opening in the side of the cap so as to warn the operator that a dangerous temperature has been reached. Contact of hot oil with the insulator 12a is reduced by means of a baffle 29 mounted on the anode shank.

The tube is provided with the usual tubular shield 30, having an opening for the X-rays, the rays passing out of the casing through a window 31 mounted in an opening in the casing wall. Adjacent this window, the casing is provided with an adapter plate 32 by which the apparatus may be attached to a suitable stand.

At the ends of the casing are cable terminal housings 33a, 33b, these housing being of metal and each having openings closed by insulators 34a, 34b, respectively. The insulators are formed with openings in which are seated terminal members 35a, 35b, the member 35a being of appropriate construction for engagement with the terminal 18 at the anode end of the tube, and the terminal 35b being of suitable construction for engaging the concentric terminal members 20 in the insulator 12b. A cable 36 extends into each housing and is held in place by a bushing 37 which is threaded upon the end of the housing, and through which the cable extends. Encircling the cable for a short distance beyond each bushing, is a spring 38, one end of which extends into the bushing.

When the housings are in assembled relation with respect to the tube casing, the insulators 12a, 12b of the casing 10 engage the insulators 34a, 34b, respectively, of the cable terminal housings, and the terminals 18 and 20 of the tube contact, respectively, with the terminals 35a and 35b associated with the cables. To increase their effectiveness, the associated casing and housing insulators are provided with interfitting parts, and the parts are so formed as to permit relative rotational movement of the casing and housings. In the construction illustrated, each of the insulators is provided with a plurality of alternate flanges and channels concentrically arranged with respect to its terminal member, and the flanges of one insulator fit snugly into the channels of one associated with it.

The housings may be secured to the casing against movement in a direction lengthwise of the casing by any suitable means, here illustrated as clamping rings 39. Each ring is formed of a pair of spaced flanges which engage similar flanges, one on the housing and the other on the casing, and the clamping rings are constructed so that they may be tightened to hold the casing and housing against separation. While performing this function, the rings may permit relative rotational movement of the casing and housing, and the position of the casing may, accordingly, be adjusted as may be required in operation without producing any change in the position of the cable terminal housings. The construction illustrated is intended for use in apparatus in which the tube casing is mounted on a support, but if desired, the cable terminal housings may be provided with suitable mounting means. In either event, the casing and housings are relatively adjustable rotationally.

As illustrated in Figure 2, the complete apparatus includes only five units, the tube casing, the clamping rings, and the cable terminal housings. In assembling the apparatus, the clamping rings are opened and the housings moved toward the casing, the insulators being fitted together so that the terminals carried thereby may make contact. The rings are then placed in position and tightened slightly to insure that the parts may be held against relative movement in a direction lengthwise of the casing, and the apparatus is then ready for attachment to the mounting. In the event, that the X-ray tube must be serviced in the field, the tube unit is removed and replaced by another, and the unit containing the damaged or worn out tube is then returned to the factory. Removal of the tube from the casing is not done in the field, and repairs to the equipment can, thus, be made without difficulty by an unskilled person. Also, the free relative rotational movement of the tube unit and cable terminal housings afforded by the apparatus makes it easy to operate.

In order that the tube unit may be small and compact, we prefer to construct the tube in accordance with the principles of the invention of our copending application, Serial No. 756,570, filed December 8, 1934, but the use of the insulating end members on the casing makes it possible to reduce the size of the latter, even when a tube of ordinary construction is employed.

We claim:

1. In an X-ray apparatus, the combination of a casing having end openings on the same axis, disc insulators mounted on the casing to close the end openings, the casing with the discs in place forming a tight enclosure containing oil, an X-ray tube mounted within the casing and immersed in the oil, terminals passing through the insulators and connected to the tube terminals, a cable terminal housing at each end of the casing, each housing including a hollow member and a disc insulator mounted to close one end thereof, a terminal passing through the housing insulator, a cable extending into each housing and connected to the terminal in the insulator thereof, and means outside the casing and housings for securing them together with the casing between the housings and their respective insulators and terminals in contact, said means preventing displacement of the housings from the casing, while permitting rotation of the casing relative to the housings and vice versa.

2. In an X-ray apparatus, the combination of a casing having end openings on the same axis, disc insulators mounted on the casing to close the end openings, the casing with the discs in place forming a tight enclosure containing oil, an X-ray tube mounted within the casing and immersed in the oil, terminals passing through the insulators and connected to the tube terminals, a cable terminal housing at each end of the casing, each housing including a hollow member and a disc insulator mounted to close one end thereof, a terminal passing through the housing insulator, a cable extending into each housing and connected to the terminal in the insulator thereof, and means outside the casing and the housings for detachably securing them together with the casing between the housings and their respective insulators and terminals in contact, said means preventing displacement of the housings from the casing, while permitting rotation of the casing relative to the housings and vice versa.

3. In an X-ray apparatus, the combination of a casing having end openings on the same axis, disc insulators mounted on the casing to close the end openings, the casing with the discs in place forming a tight enclosure containing oil, an X-ray tube mounted within the casing and immersed in the oil, terminals passing through the insulators and connected to the tube terminals, a cable terminal housing at each end of the casing, each housing including a hollow member and a disc insulator mounted to close one end thereof, a terminal passing through the housing insulator, a cable extending into each housing and connected to the terminal in the insulator thereof, and means encircling portions of the casing and housings for securing them together with the casing between the housings and their respective insulators and terminals in contact, said means preventing displacement of the housings from the casing while permitting rotational movement of the casing relative to the housing and vice versa.

4. In an X-ray apparatus, the combination of a casing having end openings on the same axis, disc insulators mounted on the casing to close the end openings, the casing with the discs in place forming a tight enclosure containing oil, an X-ray tube mounted within the casing and immersed in the oil, terminals passing through the insulators and connected to the tube terminals, a cable terminal housing at each end of the casing, each housing including a hollow member and a disc insulator mounted to close one end thereof, a terminal passing through the housing insulator, a cable extending into each housing and connected to the terminal in the insulator thereof, projecting flanges on the casing at the ends thereof, similar flanges on the housings adjacent the insulators thereon, and a pair of clamping rings, each engaging flanges on one housing and on the casing, said rings securing the casing and housings together with the casing between the housings and their respective insulators and terminals in contact, said rings preventing displacement of the housings from the casing while permitting rotation of the casing relative to the housings and vice versa.

5. In an X-ray apparatus, the combination of a casing having end openings on the same axis, disc insulators mounted on the casing to close the end openings, the casing with the discs in place forming a tight enclosure containing oil, an X-ray tube mounted within the casing and immersed in the oil, terminals passing through the insulators and connected to the tube terminals, a cable terminal housing at each end of the casing, each housing including a hollow member and a disc insulator mounted to close one end thereof, a terminal passing through the housing insulator, a cable extending into each housing and connected to the terminal in the insulator thereof, concentric flanges on the outer faces of the casing and housing insulators, and means outside the casing and housings for securing them together with the casing between the housings and their respective insulators and terminals in contact, the flanges on the contacting insulators interfitting, said means preventing displacement of the housings from the casing while permitting rotation of the casing relative to the housings and vice versa.

6. In an X-ray apparatus, the combination of a casing having end openings on the same axis, disc insulators mounted on the casing to close the end openings, the casing with the discs in place forming a tight enclosure containing oil, an X-ray tube mounted within the casing and immersed in the oil, terminals passing through the insulators and connected to the tube terminals, a cable terminal housing at each end of the casing and extending at an angle to the axis thereof, each housing including a hollow member and a disc insulator mounted to close one end thereof, a terminal passing through the housing insulator, a cable extending into each housing and connected to the terminal in the insulator thereof, and means outside the casing and housings for securing them together with the casing between the housings and their respective insulators and terminals in contact, said means preventing displacement of the housings from the casing, while permitting rotation of the casing relative to the housings and vice versa.

7. In an X-ray apparatus, the combination of a casing having open ends on the same axis, disc insulators mounted on the casing to close the end openings, the casing with the discs in place forming a tight enclosure containing oil, terminals passing through the insulators and having portions exposed beyond the exposed faces of said insulators, the exposed portions of said terminals lying on the same axis, an X-ray tube mounted within the casing and immersed in the oil, and connections immersed in the oil between the tube terminals and those in the insulators.

8. In an X-ray apparatus, the combination of a casing having open ends lying in the same axis, disc insulators mounted within the casing at the ends thereof to close said ends, said insulators having portions extending beyond said ends, terminals passing through the insulators, said terminals lying on the same axis and with the insulators in place forming a tight enclosure for a body of oil, an X-ray tube mounted within the casing and immersed in the oil, and connections within the oil between the tube terminals and the terminals in the insulators.

9. In an X-ray apparatus, the combination of a generally cylindrical casing having open ends, disc insulators mounted in the ends of the casing to close said ends, terminals passing through the insulators, said terminals lying on the same axis, sealing means between the insulators and the casing, said casing, insulators, and sealing means forming a tight enclosure containing a body of oil, an X-ray tube mounted within the casing, and connections between the tube terminals and the adjacent insulator terminals.

10. In an X-ray apparatus, the combination of a casing having open ends on the same axis, disc insulators mounted at the ends of the casing, sealing means between the insulators and casing, the casing wall, the insulators, and sealing means forming a tight enclosure containing a body of oil, terminals passing through the insulators, said terminals lying on the same axis, an X-ray tube mounted within the casing, connections between the tube terminals and those in the adjacent insulators, and a conduit within the casing supplied from outside the latter with a fluid for cooling the oil.

11. In an X-ray apparatus, the combination of a casing having open ends on the same axis, disc insulators mounted on the casing to close said ends, said insulators having concentric flanges on their exposed faces, a terminal passing through each insulator at the center of said flanges, said terminals lying on the same axis, the casing with the insulators in place forming a tight enclosure containing a body of oil, and an X-ray tube mounted in the casing and having terminals connected to the terminals passing through the insulators.

JOSEPH W. SKEHAN.
RAYMOND R. MACHLETT.